United States Patent [19]

Isono et al.

[11] Patent Number: 4,824,200
[45] Date of Patent: Apr. 25, 1989

[54] OPTICAL BRANCHING FILTER

[75] Inventors: Hideki Isono, Kawasaki; Kazushi Asanuma, Suzaka; Takashi Yokota, Yamato; Kiyoshi Terai, Tokyo, all of Japan

[73] Assignee: Fujitsu Limited, Kawasaki, Japan

[21] Appl. No.: 11,602

[22] Filed: Feb. 6, 1987

[30] Foreign Application Priority Data

Feb. 6, 1986 [JP] Japan ................................. 61-25151

[51] Int. Cl.$^4$ ................................................ G02B 6/28
[52] U.S. Cl. ................................................... 350/96.16
[58] Field of Search ............... 350/96.15, 96.16, 96.18, 350/96.19; 370/3, 6; 455/610, 612

[56] References Cited

U.S. PATENT DOCUMENTS

| 4,274,706 | 6/1981 | Tangonan | 350/96.16 X |
| 4,482,994 | 11/1984 | Ishikawa | 350/96.19 X |
| 4,701,012 | 10/1987 | Kaiser | 350/96.16 X |
| 4,705,349 | 11/1987 | Reedy | 350/96.18 X |

FOREIGN PATENT DOCUMENTS

| 0068198 | 1/1983 | European Pat. Off. |
| 0146957 | 12/1984 | European Pat. Off. |
| 56-85701 | 7/1981 | Japan |
| 57-81227 | 5/1982 | Japan |
| 58-149018 | 9/1983 | Japan |

OTHER PUBLICATIONS

European Search Report, Jun. 1, 1987; The Hague by Examiner Pfahler, R.
"Four–Channel Optical Branching Filter", Fujitsu Scientific and Technical Journal, vol. 21, No. 5, (Dec. 25, 1985), pp. 511-526.

*Primary Examiner*—William L. Sikes
*Assistant Examiner*—Akm E. Ullah
*Attorney, Agent, or Firm*—Staas & Halsey

[57] ABSTRACT

An optical branching filter branches or mixes lights of n-kind of wavelengths. An input/output port for the light mixed n-kind of wavelengths is provided to one of two surfaces of the transparent block and second input-/output parts for forming optical filters allowing only the lights having the predetermined wavelengths to pass therethrough, respectively among the lights in n-kind of wavelengths, but reflecting the lights having other wavelengths, respectively is provided to any one of two surfaces. A first input/output port and n second input/output ports, respectively is formed by an optical waveguide and a lens which optically connects the optical waveguide and first input/output part or a second input/output part. Positions of each second input-/output port are selected so that the length of optical paths formed between the lenses of the first input/output port in the second input/output port are in the reverse proportion to the lengths of wavelengths corresponding to the second input/output portions.

8 Claims, 5 Drawing Sheets

OPTICAL BRANCHING FILTER

BACKGROUND OF THE INVENTION

1. Field of the Invention

The present invention relates to an optical branching filter which mixes or branches different wavelengths of light to or from a single beam of light.

2. Description of the Related Art

An optical branching filter is a basic component of a wavelength dividing multiplexing optical communication system. For example, in a single line of optical fiber it is possible to use n different wavelengths $\lambda_1, \lambda_2, \ldots, \lambda_n$ of light to transmit n times as much information as is possible using a single wavelength $\lambda_0$ of light. Further, n-channel two-way simultaneous optical communication can be realized by allocating the different wavelengths of light for transmission and reception. This can be accomplished, for example, by allocating wavelengths $\lambda_1, \lambda_3, \ldots, \lambda_{2n-1}$ for transmission and wavelengths $\lambda_2, \lambda_4, \ldots, \lambda_{2n}$ for reception.

In order to realize such an optical communication system, an optical mixing filter is required which mixes the different wavelengths of light and inputs the mixed wavelength lightbeam to a single line of optical fiber. The optical mixing filter is arranged at a sending side of the optical communication system. Also required is an optical branching filter which separates out the respective wavelengths of light from the mixed wavelength lightbeam, which is arranged at the receiving side of the system.

The optical mixing filter and optical branching filter in the prior art generally mix and branch the various wavelengths of light by employing a dielectric material filter. This filter is composed of a thin dielectric multilayer film laminated in a plurality of layers, such as $SiO_2$ and $TiO_2$. The filter acts as a bandpass filter, which allows the transmission of a particular wavelength of light, but reflects all other wavelengths of light.

The optical mixing filter can also be used as the optical branching filter, and visa versa, by inverting the incoming and outgoing directions of light to and from the dielectric material filter. These mixing and branching filters have the same structure, and these filters are both called optical branching filters. To fully realize this optical branching filter, further optical components, in addition to the dielectric material filter, are required. For example, these include a plurality of optical lenses, which cause the lightbeam output from the optical fiber to be effectively input into each dielectric material filter, and conversely causes the lightbeam from the dielectric material filter to be effectively input into the optical fiber, and a plurality of fixing mechanisms, which fix an end face of the optical fiber for proper focusing of the lenses.

However, the optical branching filter deals with the various wavelengths of light. A refractive index of a lens generally changes in accordance with the wavelengths of light, and therefore the focal point of a lens depends on the wavelength of light.

Therefore, since the fixing mechanisms require adjustment for the focal points for each wavelength, the manufacturing yield of optical branching filters deteriorates. This deterioration becomes even more distinct with an increase in the number of different wavelengths of light to be mixed or branched. This has become significant as various kinds of semiconductor lasers and light emitting diodes using a wide range of wavelengths from long to short have been developed. The variety of wavelengths dealt with by an optical branching filter can therefore be large, and thus the problem of adjustment for the numerous focal points is very serious.

SUMMARY OF THE INVENTION

Accordingly, it is an object of the present invention to provide an optical branching filter which is capable of improving the manufacturing yield during production by realizing a common adjustment of the distance between a lens and an end face of an optical fiber independent of the number and variety of wavelengths.

According to the present invention, an optical branching filter is provided, comprising:

an optical branching filter for branching or mixing a plurality of wavelengths of light, comprising:

an optically transparent block having first and second parallel surfaces;

a primary input/output port including an primary optical fiber for providing or receiving a mixed wavelength light beam to or from said block and a primary lens;

primary input/output means, mounted on the first surface of said block, for provided to or receiving from said primary input/output port the mixed wavelength lightbeam;

a plurality of secondary input/output means, mounted on said first and second surfaces of said block, one corresponding to each wavelength of light in said mixed wavelength lightbeam, each said secondary input/output means for inputting or outputting its corresponding wavelength of light into or out of said block and reflecting all other wavelengths of light, forming an optical path within said block; and a plurality of secondary input/output ports, one corresponding to each of said secondary input/output means, each including a second optical fiber for receiving or providing each of the predetermined wavelengths of light from or to its corresponding secondary input/output means and a secondary lens, wherein a position of each said secondary input/output ports is selected so that the length of wavelength optical paths formed between said primary input/output port and each of said secondary input/output ports are in reverse proportion to the lengths of the wavelengths corresponding to each of said secondary input/output ports and each of said primary and secondary lenses is positioned at a singel predetermined distance from its respective said primary and secondary optical fibers.

BRIEF DESCRIPTION OF THE DRAWINGS

The like elements are given the like reference numerals throughout the drawings.

DETAILED DESCRIPTION OF THE PREFEERRED EMBODIMENTS

Figure 1A:
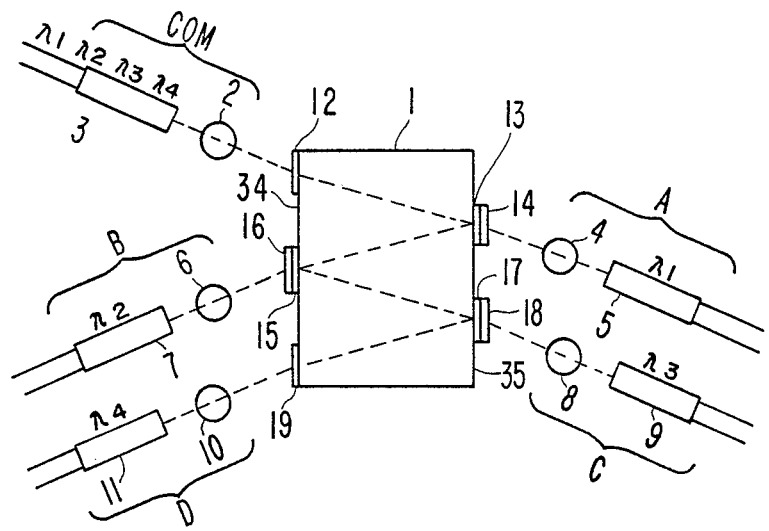
FIGS. 1A and 1B are schematic plan views of an optical branching filter according to the present invention.
Figure 1B:
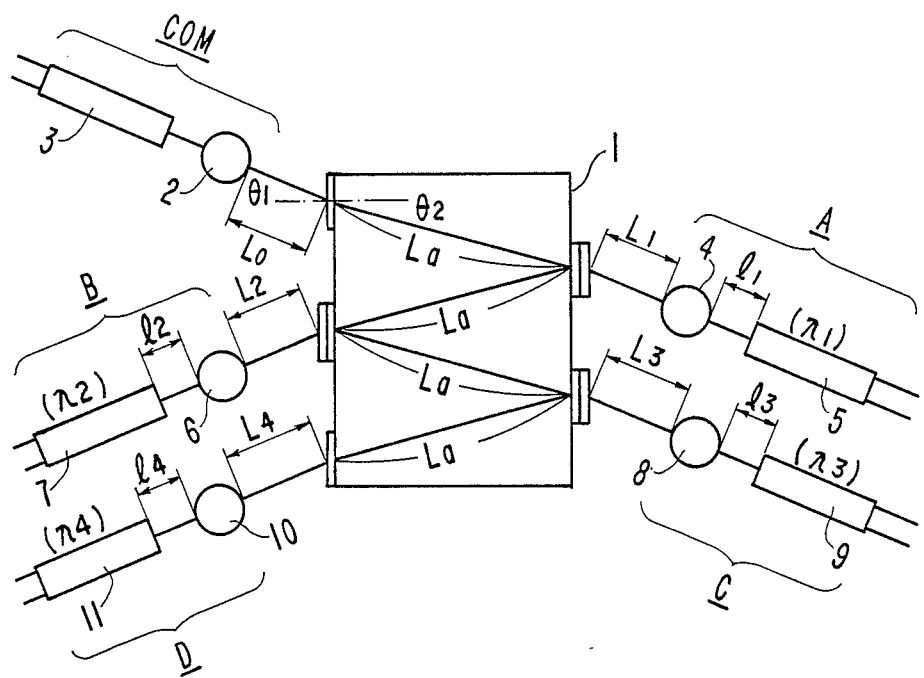

FIGS. 1A and 1B are schematic plan views illustrating a general structure of an optical branching filter of the present invention. In FIGS. 1A and 1B, four different wavelengths of light, $\lambda_1$, $\lambda_2$, $\lambda_3$, $\lambda_4$, are mixed and branched. A block 1 comprises an optically transparent substance, such as BK7, and a pair of parallel surfaces 34 and 35. The parallel surfaces 34 and 35 are provided with a first bandpass filter 13 which allows only light having wavelength $\lambda_1$ to pass therethrough, a second bandpass filter 15 which allows only light having wavelength $\lambda_2$ to pass therethrough, and a third bandpass filter 17 which allows only light having wavelength $\lambda_3$ to pass therethrough.

A lightbeam having the four wavelengths $\lambda_1$, $\lambda_2$, $\lambda_3$, $\lambda_4$ is emitted from an end face of an optical fiber 3. The four wavelengths of light in the lightbeam are made parallel by a lens 2, and are then input to the block 1 through an anti-reflection film 12 provided on the surface 34 for eliminating reflected light. In the case of branching (converting lightbeam having four different wavelengths to four single wavelength lightbeams) the mixed wavelength lightbeam is input from the end face of the optical fiber 3. Only light having wavelength $\lambda_1$ is able to pass through the first bandpass filter 13, which is provided on the opposite surface 35 of the block 1 from the input surface 34 of the block 1, on which the film 12 is located. Light having wavelength $\lambda_1$ is output to the outside of the block 1 through the first bandpass filter 13 and an anti-reflection film 14 provided on the surface of the first bandpass filter B, is focused by a lens 4 and is then input to an optical fiber 5. The light having wavelengths $\lambda_2$, $\lambda_3$, $\lambda_4$ is reflected back through the block 1 toward the second bandpass filter 15. Only light of wavelength $\lambda_2$ is able to pass through the second bandpass filter 15, thus only light of wavelength $\lambda_2$ is output to outside of the block 1 through an anti-reflection film 16. The output light is focused by lens 6 and is then input to an optical fiber 7. Light having wavelengths $\lambda_3$, $\lambda_4$ is reflected back through the block 1 toward the third bandpass filter.

In the same way as described above only light having wavelength $\lambda_3$ is able to pass the third bandpass filter 17 for input to an optical fiber 9 via a lens 8 and an anti-reflection film 18. In this case, the light reflected by the third bandpass filter 17 is the light of wavelength $\lambda_4$ only. Light of the wavelength $\lambda_4$, passes back through the block, and is input to an optical fiber 11 via an anti-reflection film 19 and a lens 10.

The bandpass filters 13, 15, 17 and anti-reflection films 12, 14, 16, 18, 19 are formed by a dielectric multi-layer film material of $SiO_2$ and $TiO_2$. The layers are obtained by vacuum deposition.

In the example explained above, light of each wavelength is branched one after the other from the mixed lightbeam having the four different wavelengths. It follows that each of the receiving optical fibers 5, 7, 9, 11 can output lightbeams having the individual wavelengths $\lambda_1$, $\lambda_2$, $\lambda_3$, $\lambda_4$, respectively, which can be mixed in the block 1 and input to the optical fiber 3. Thus by reversing the direction of the light of wavelengths $\lambda_1$, $\lambda_2$, $\lambda_3$, $\lambda_4$, the device becomes an optical mixing filter.

A problem arises in that the lenses 2, 4, 6, 8, 10 deal with light of different wavelengths. A refractive index of a lens changes in accordance with wavelength, and therefore the focal point of each of the lenses 4, 6, 8, 10 is also different at each of input/output ports A, B, C, D, which are the combinations of the optical fibers 5, 7, 9, 11 and their respective lenses 4, 6, 8, 10.

In order to have the light of wavelengths $\lambda_1$, $\lambda_2$, $\lambda_3$, $\lambda_4$ input most effectively to the optical fibers 5, 7, 9, 11, the end faces of optical fiber 5, 7, 9, 11 must be provided at the focal points of the lenses 4, 6, 8, 10 at the respective input/output ports.

Therefore, since the end faces of each optical fiber 5, 7, 9, 11 must be arranged at the focal point for its respective input/output port A, B, C, D, adjustment is required for distances $l_1$, $l_2$, $l_3$, $l_4$ between the lenses 4, 6, 8, 10 and the end faces of the optical fiber 5, 7, 9, 11 respectively (FIG. 1B).

Figure 3:
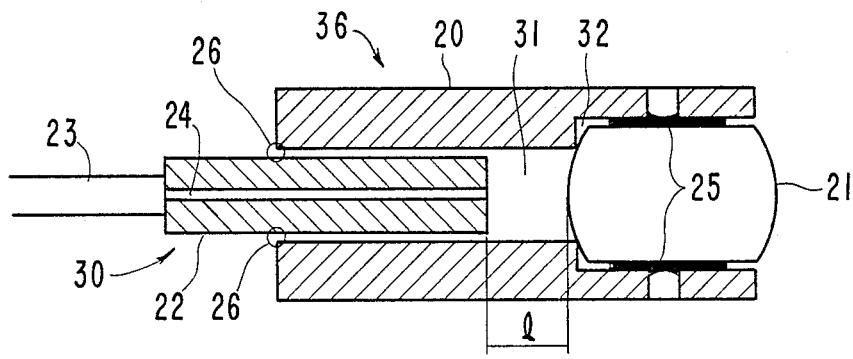
FIG. 3 is a cross-sectional elevational view of an assembly for an end face of an optical fiber and a lens.

The input/output ports A, B, C, D and a mixed lightbeam input/output port COM (the optical fiber 3 and the lens 2) are assembled as shown in FIG. 3. FIG. 3 is a cross-sectional view of the structure of an assembly 36 for any of the lenses and optical fibers at the respective input/output ports A, B, C, D, COM. The end portion of an optical fiber cord 23, which can be nylon for protecting an optical fiber 24 is removed and a ferrule 30 is formed around the optical fiber 24 (core and clad) by a sleeve 22, into which the optical fiber 24 is inserted. An assembly holder 20 provides a first cylindrical opening 31 for fixing the ferrule 30, and a second cylindrical opening 32 for fixing a lens 21. The lens 21 is bonded to the assembly holder 20 by application of glass solder 25, which allows different diameters of lenses to be used. Moreover, the ferrule 30 is fixed to the assembly holder 20 by laser welding the sleeve 22 to the holder 20 at entrance 26 to the first cylindrical opening 30. The lens 21 is a drum lens, which formed by grinding a spherical lens. (Mounting a drum lens is easier than fixing a spherical lens.)

Figure 4A:
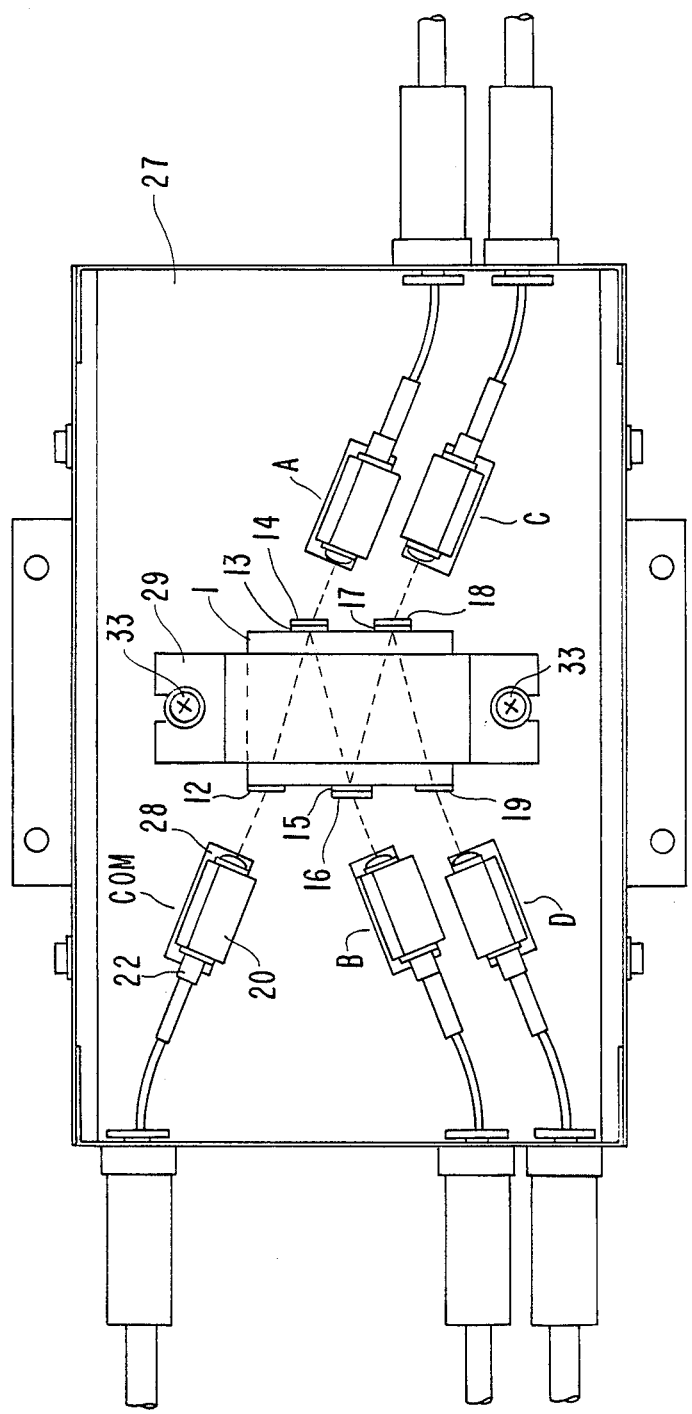
FIG. 4(A) is a plan view of an optical branching filter according to the present invention.
Figure 4B:
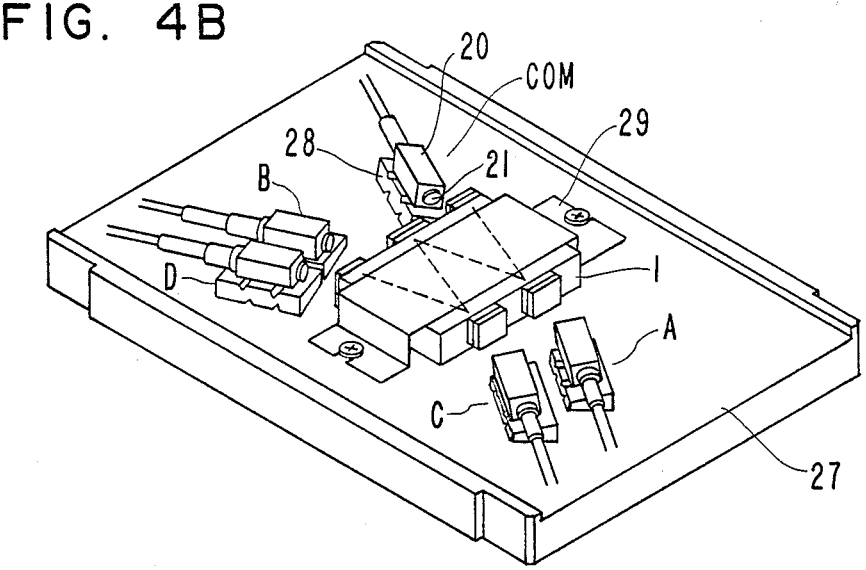
FIG. 4(B) is a perspective view of the view of the optical branching filter of FIG. 4A.

The assembled input/output ports A, B, C, D, COM are fixed on a substrate 27 using oblique spacers 28 as shown in FIGS. 4A and 4B. Moreover, the block 1 is fixed onto the substrate 27 using a mounting member 29, which is screwed into the substrate 27 using screws 33. The input/output ports A, B, C, D, COM are mounted the oblique spacers 28 in order to make matching the optical axes easier.

It is possible to accurately mount the optical components onto the substrate 27 such that a spherical lens and an optical fiber, which form respective input/output ports, are assembled as a unit. However, it is very difficult to adjust the distances between the end of the optical fiber and the spherical lens, shown in FIG. 3, corresponding to respective input/output ports A, B, C, D, COM (corresponding to wavelength).

Accordingly, it is apparent that the manufacturing yield can be very much improved by making the distances $l_1$, $l_2$, $l_3$, $l_4$ between the ends of the optical fibers 5, 7, 9, 11 and lenses 4, 6, 8, 10 irrespective of the corresponding wavelength. A method for making the distances $l_1$, $l_2$, $l_3$, $l_4$, between the ends of the optical fibers and the lenses equal will be explained hereunder.

Figure 2:
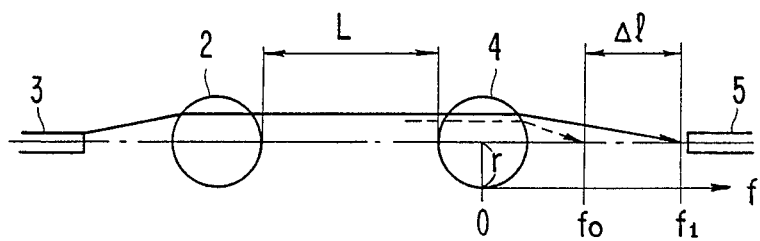
FIG. 2 is a schematic cross-sectional view illustrating the distances between lenses and an optical fiber and focal points of the lenses of the optical branching filter of FIG. 1A.

FIG. 2 is a schematic view illustrating the lens-to-lens distance $L=L_0+L_a+L_1$ between the lenses 2, 4 in the input/output port COM and input/output port A in FIG. 1A, and the distance $L_1$ between the end face of the optical fiber 5 and the lens 4 at the input/output port A.

Given that $\lambda_0<\lambda_1$, and a focal point of the lens 4 for light of wavelength $\lambda_0$ is $f_0$, the focal point of the lens 4 for the light of wavelength $\lambda_1$ will be $f_1$. This relationship holds, since the refraction index decreases as the wavelength becomes longer. Thus the focal point of the lens 4 shifts such a direction as that the focal point $f_1$ is farther from the lens 4 than the focal point $f_0$.

The case in which BK7 is used as the lens material is expalined in detail below.

A refraction index of BK7 is 1.5145 for an He-Ne laser beam having a wavelength $\lambda_0=0.63$ μm. When a radius r of a spherical lens is 2.5 mm, the focal distance $f_0$ is 1.18 mm.

Figure 5:
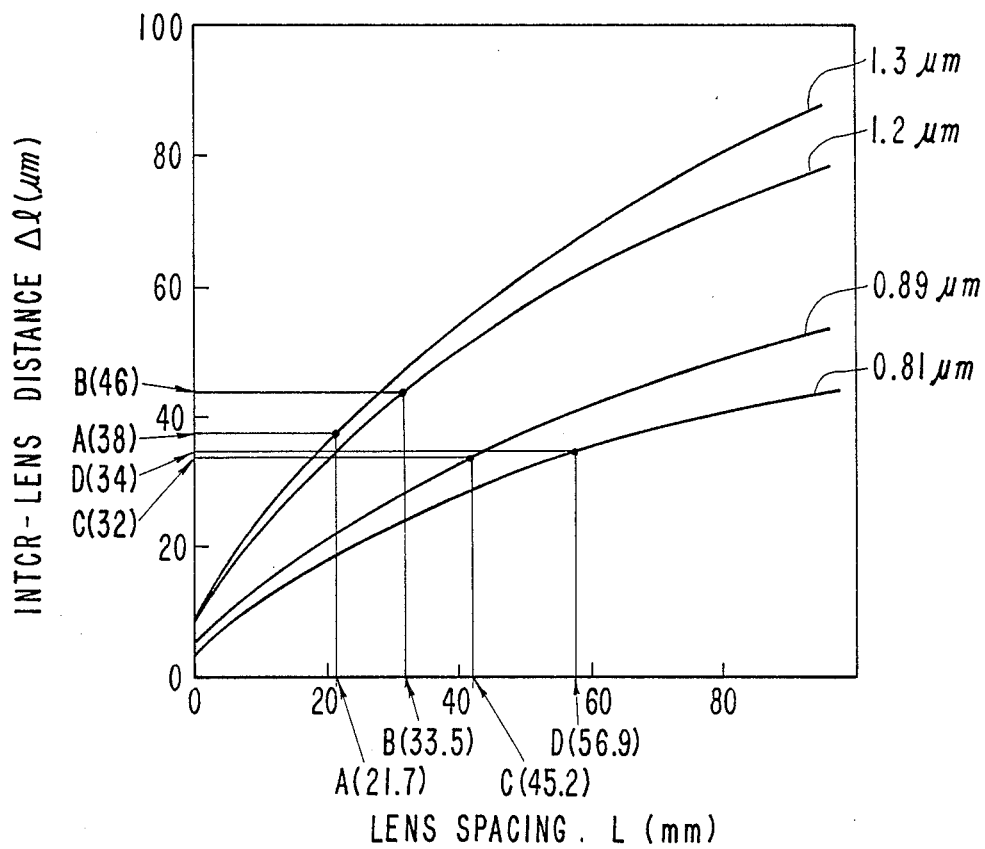
FIG. 5 is a graph illustrating the relationship of the distances between lenses and the distance between one of the lenses and an optical fiber end face.

FIG. 5 shows the relationships between the lens-to-lens distance L and an increment $\Delta l$ of focal distance for wavelengths of $\lambda=1.3$ μm, 1.2 μm, 0.89 μm and 0.81 μm with reference to $f_0=1.18$ μm. As is apparent from FIG. 5, when the lens-to-lens distance L increases, increment $\Delta l$ of focal distance also increases.

Moreover, it can also be understood from FIG. 5 that the rate of increase for the increment $\Delta l$ is larger for longer wavelengths. When the light emitted from an end of an optical fiber is converted to perfectly parallel light by a lens, the increment $\Delta l$ only depends on the wavelength without depending on the lens-to-lens distance L. However, a spherical (or drum) lens cannot convert light to the perfectly parallel light, and converts it actually to light which is a slightly diverging. Accordingly, when the lens-to-lens distance L increases, the increment $\Delta l$ also increases.

Further investigation of FIG. 5 shows that a longer wavelength generally results in a larger increment $\Delta l$. On the other hand, a shorter wavelength results in a shorter increment $\Delta l$. Therefore, when the lens-to-lens distance L of shorter wavelength is set larger, and the lens-to-lens distance L of a longer wavelength is set smaller, the difference between the distances $l_1, l_2, l_3, l_4$, can be smaller. Considering these points, difference of distance between a lens and an end face of an optical fiber resulting from a difference of wavelengths can be alleviated to such a degree as to be aberration, by setting the lens-to-lens distance in reverse proportion to the length of wavelength. To be more specific, the lens-to-lens distance L between the lens 2 of the mixed lightbeam input/output port COM and the lenses 4, 6, 8, 10 of the input/output ports A, B, C, D of respective wavelengths can be set in such a manner that it is reversely proportional to wavelength by setting the wavelengths of the input/output ports A, B, C, D in such a manner as $\lambda_1>\lambda_2>\lambda_3>\lambda_4$ in FIG. 1.

Figure 6:
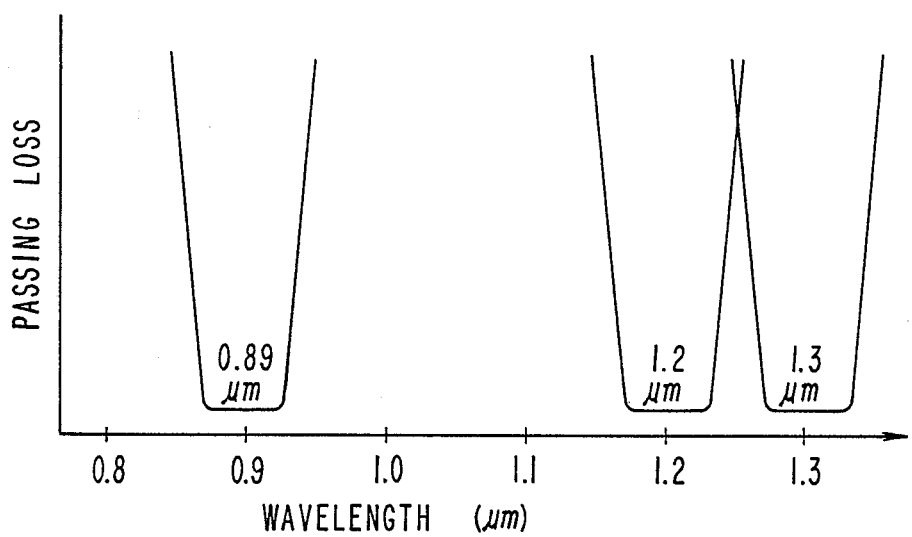
FIG. 6 is a graph illustrating wavelength characteristics of dielectric material filters.

In the following explanation, practical values are given. The wavelengths are set as follow: $\lambda_1=1.3$ μm; $\lambda_2=1.2$ μm; $\lambda_3=0.89$ μm; and $\lambda_4=0.81$ μm. The wavelength characteristics of the filters for each wavelength are set to that of bandpass filters shown in FIG. 6. As previously described, a bandpass filter for the wavelength $\lambda_4$ is unnecessary. The incoming angle $\theta_1$ of light at the input/output port COM is set to 23°, outgoing angle $\theta_2$ to 15°, the refractive index n for the reference light of block 1 (He-Ne laser beam wavelength=0.63 μm) is 1.5154, and the distance between the respective lens and the block 1 at each input/output port COM, A, B, C, D is set to $L_0=L_1=L_2=L_3=L_4=5$ mm. The distance between the lens 2 of the input/output port COM and the lens 4 of input/output port A can then be expressed as follows:

$$L_0+L_1+L_a\times 1/(\cos 15°)\times(1/n)=21.7 \text{ mm}$$

In the same way, the distances between the lens 2 of the input/output port COM and the lenses 6, 8, 10 of the input/output ports B, C, D, respectively, can be expressed as follows:

$$L_0+L_2+L_a\times 2/(\cos 15°)\times(1/n)\div 33.5 \text{ mm};$$

$$L_0+L_3+L_a\times 3\times 1/(\cos 15°)\times(1/n)\div 45.2 \text{ mm};$$

and $$L_0+L_4+L_a\times 4\times 1/(\cos 15°)\times(1/n)\div 56.9 \text{ mm}$$

The value 1/COS 15° is used for converting $L_a$ to the distance in the air. In this case, deviation $\Delta l$ of focal distance at each input/output port can be obtained from FIG. 5 as follows:

Input/output port A; $\Delta l=38$ μm

Input/output port B; $\Delta l=46$ μm

Input/output port C; $\Delta l=32$ μm

Input/output port D; $\Delta l=34$ μm

Therefore, since the focal distance $f_0$ of a spherical lens for the reference light is 1.18 mm, the optimum distances $l_1, l_2, l_3, l_4$ between the end face of the optical fiber and its respective lens at each input/output port A, B, C, D are indicated as follows:

At the input/output port A, $l_1=1.18+0.038$ (mm)
At the input/output port B, $l_2=1.18+0.046$ (mm)
At the input/output port C, $l_3=1.18+0.032$ (mm)
At the input/output port D, $l_4=1.18+0.034$ (mm)

A mean value of the maximum and minimum values for all input/output ports can be obtained as follows:

$$(0.046+0.032)/2=0.040$$

Therefore, in the case where a common deviation $\Delta l$ at each input/output port is set to 0.040, the following can be obtained:

$$l=l_1=l_2=l_3=l_4=1.18+0.04=1.22 \text{ mm.}$$

That is, a common value=1.22 mm is obtained, which is the common distance between each optical fiber end face and lens set.

Figure 7:
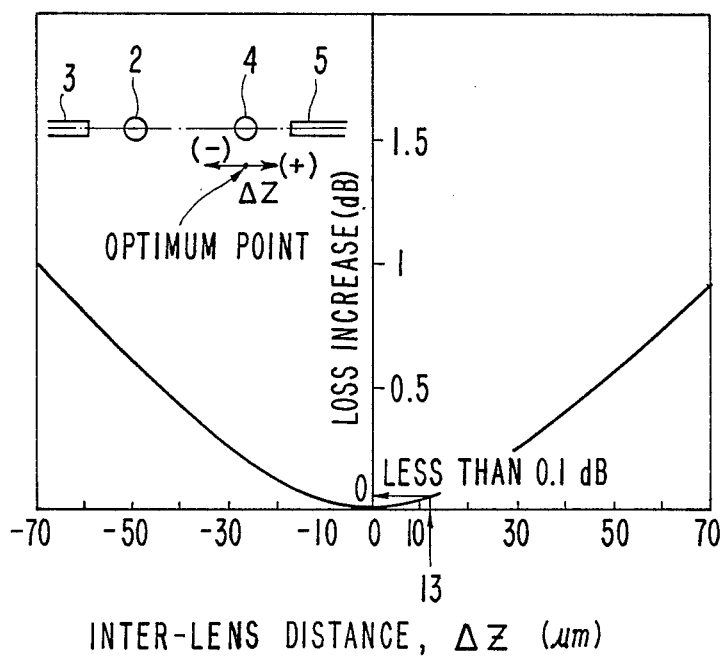
FIG. 7 is graph illustrating relationships of the distance between a lens and an optical fiber end face and loss increase.

FIG. 7 is a graph which indicates the loss due to a deviation $\Delta z$ from the optimum position of a lens at an input/output port, corresponding to FIG. 2. As is obvious from FIG. 7, loss is 0.1 dB or less when $\Delta z<13$ μm. When $\Delta z \leq 13$ μm, the influence of the loss is so small that it can be neglected.

As explained above, when $\Delta l$ is set to 40 μm, the maximum $\Delta z$ for respective input/output ports A, B, C, D is equal to $40-32=8$ μm $\leq 13$ μm.

Accordingly, distance between the end face of the optical fiber and the lens at each input/output port can be set in common.

If $\Delta l$ cannot be determined to be so small so as to be merely aberration, the lens-to-lens distances between the input/output ports can be changed by adjusting distances $L_0, L_1, L_2, L_3, L_4$ of the input/output ports A, B, C, D, COM, in view of the relation between L and $\Delta l$.

What is claimed is:

1. An optical branching filter for branching or mixing a plurality of wavelengths of light, comprising:
   an optically transparent block having first and second parallel surfaces;
   a primary input/output port including a primary optical fiber for providing or receiving a mixed wavelength light beam to or from said block and a primary lens;
   primary input/output means, mounted on the first surface of said block, for provided to or receiving from said primary input/output port the mixed wavelength light beam;
   a plurality of secondary input/output means, mounted on said first and second surfaces of said block, one corresponding to each wavelength of light in said mixed wavelength light beam, each said secondary input/output means for inputting or outputting its corresponding wavelength of light into or out of said block and reflecting all other wavelengths of light, forming an optical path within said block; and
   a plurality of secondary input/output ports, one corresponding to each of said secondary input/output means, each including a secondary optical fiber for receiving or providing each of the predetermined wavelengths of light from or to its corresponding secondary input/output means and a secondary lens,
   wherein a position of each said secondary input/output ports is selected so that the length of wavelength optical paths formed between said primary input/output port and each of said secondary input/output ports are in reverse proportion to the lengths of the wavelengths corresponding to each of said secondary input/output ports and each of said primary and secondary lenses is positioned at a single predetermined distance from their respective said primary and secondary optical fibers.

2. An optical branching filter according to claim 1, wherein the lens in each said primary input/output port and each of said secondary input/output ports comprise a lens mounted in the optical path between its respective said optical fiber and said glass block.

3. An optical branching filter according to claim 2, wherein distances between the end of the optical fiber and the lens in each of said secondary input/output ports are equal to a mean value of optimum distance values for each of said secondary input/output ports.

4. An optical branching filter according to claim 2, wherein said primary and each of said secondary input/output ports further comprise include a cylindrical holder for holding the optical fiber and the lens therein.

5. An optical branching filter according to claim 3, wherein the mean value can be set to a desired value by adjusting the distance between each of said secondary input/output ports and said block.

6. An optical branching filter according to claim 2, wherein said block comprises BK7.

7. An optical branching filter according to claim 2, wherein said primary input/output means and a final secondary input/output means on the optical path comprise an antireflection film, and the remaining secondary input/output means comprise a band pass filter, for allowing the predetermined wavelength of light corresponding to the input/output means to pass therethrough, and an antireflection film.

8. An optical branching filter for branching or mixing lights of n-kind of wavelengths, comprising:
   a block which is optically transparent and has two parallel surfaces;
   a first input/output part for the lights mixed from n-kind of wavelengths provided on one of said two surfaces;
   second input/output parts provided on alternating ones said two surfaces for forming optical filters allowing only the lights having the predetermined wavelengths to pass therethrough among the lights of the n-kind of wavelengths, and reflecting the lights having other wavelengths; and
   a first input/output port and n second input/output ports respectively formed by an optical waveguide and a lens which optically connects said optical waveguide and said first input/output part or a respective one of said second input/output parts,
   wherein each said lens is spaced from its respective said first input/output part or said second input/output part and positions of each of said second input/output port are selected so that the lengths of optical paths formed between the lenses of said first input/output port and said second input/output port are in the reverse proportion to the lengths of wavelengths corresponding to said second input/output ports.

* * * * *